Nov. 18, 1958   J. C. DENMAN, JR., ET AL   2,860,420
VOLUME MEASURING APPARATUS
Filed Jan. 27, 1955   2 Sheets-Sheet 1
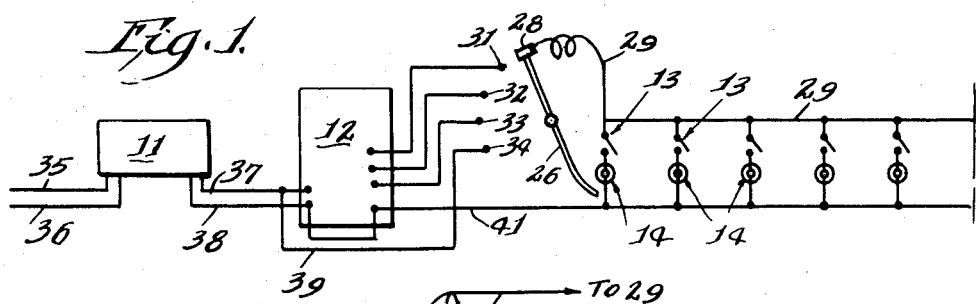
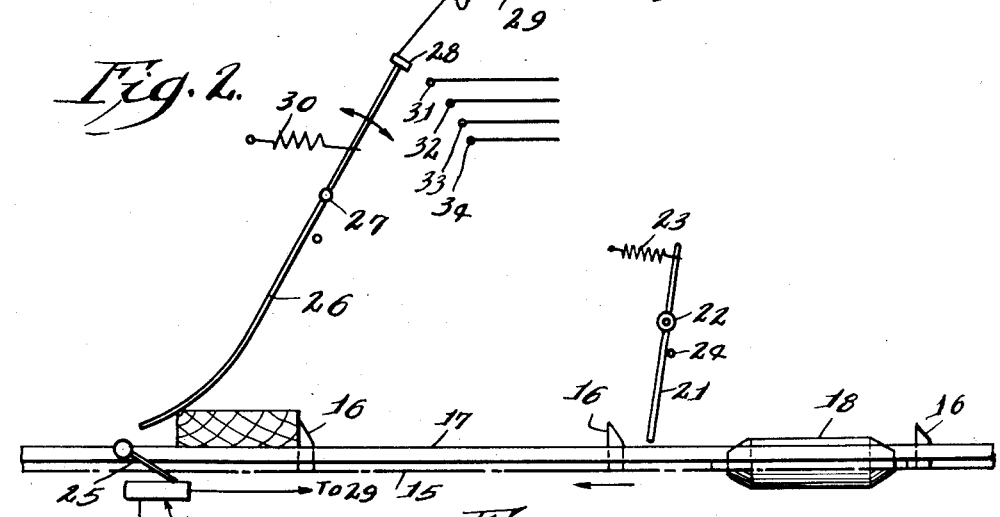
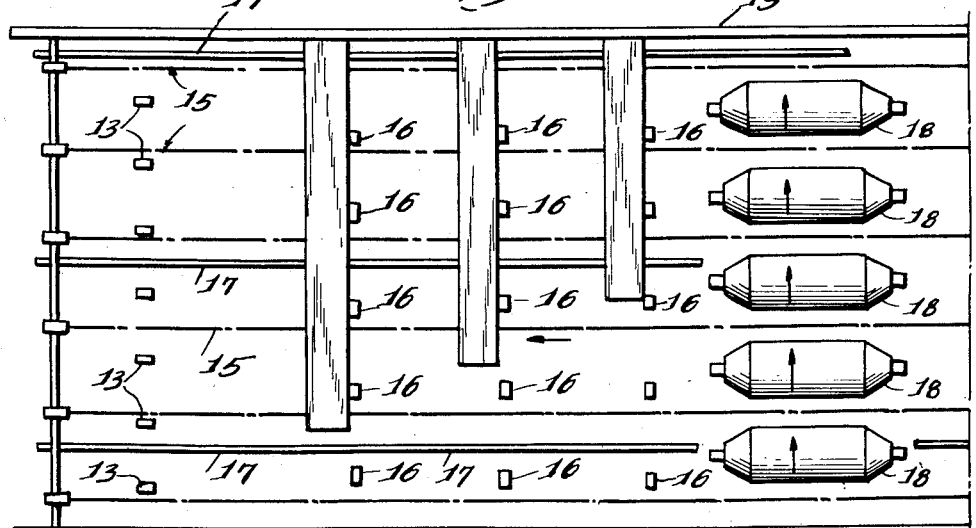
Inventors.
Joe Carter Denman Jr.
Robert Hansen.
By Foley and Lindberg
Attorneys.

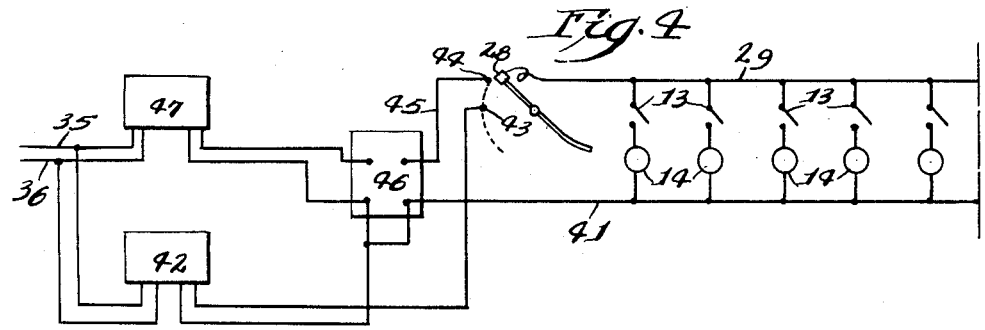
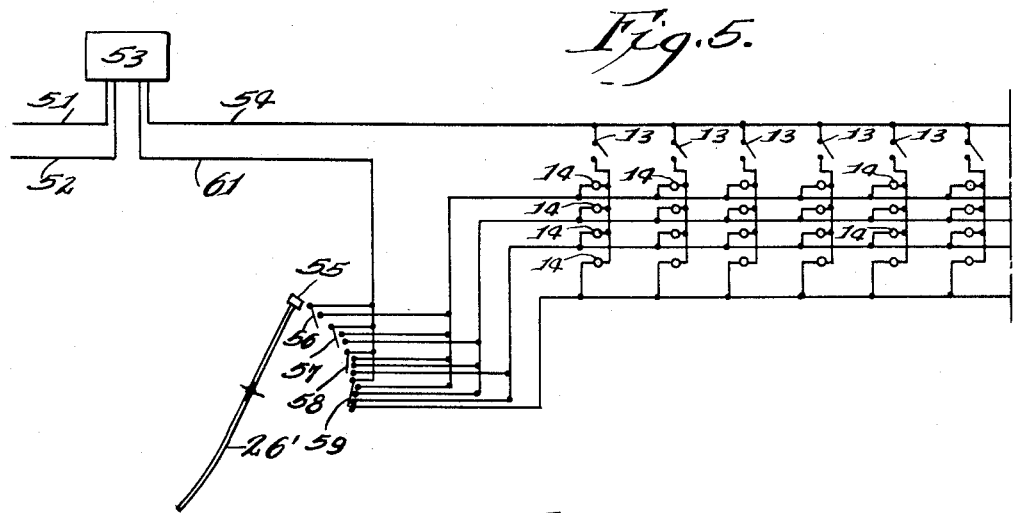
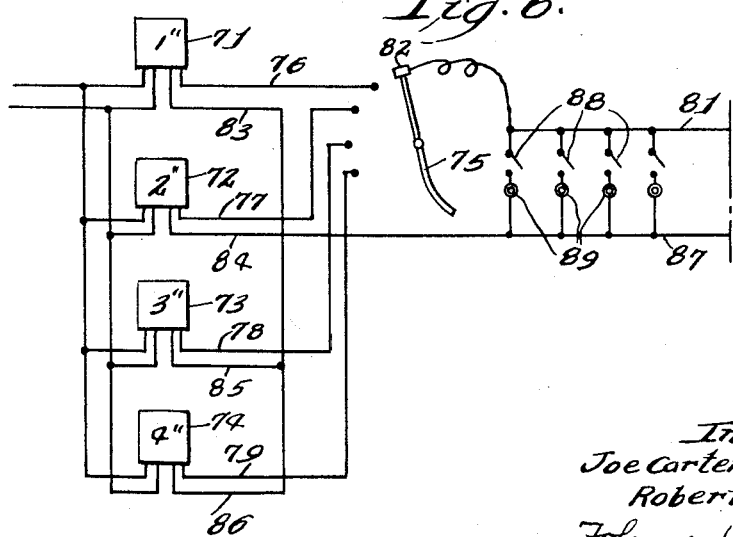

United States Patent Office 2,860,420
Patented Nov. 18, 1958

2,860,420

VOLUME MEASURING APPARATUS

Joe Carter Denman, Jr., and Robert Hansen, Diboll, Tex., assignors to Southern Pine Lumber Company, Diboll, Tex., a corporation of Texas Application January 27, 1955, Serial No. 484,520

8 Claims. (Cl. 33—174)

This invention relates to improvements in apparatus for measuring and recording the volume of objects such as lumber and other articles having substantial length, thickness and width.

The principles of the invention will become readily appreciated from the description herein of apparatus designed especially for measuring the volume of sawn lumber such as a commercial lumber mill produces commonly as boards and timbers having various lengths, widths and thicknesses.

In the conventional saw mill, after boards have been cut from a log and trimmed to standard commercial lengths such as 6, 8, 10, 12 or 14 foot lengths and other lengths, the boards are usually advanced by a conveyor chain known as the "green" chain to other places in the mill for further treatment. It has been for many years and still is common practice to make a visual estimate of the length, width and thickness of each board moving on the green chain and to record those estimates by hand for various informational and record purposes. This tedious operation diverts one or more men to work which does not utilize their full capabilities, and has other disadvantages.

The present invention aims to provide apparatus which will substitute automatic measuring for the visual estimating and will record the result in such a manner that the number of board feet passing over the green chain in any time period may readily be ascertained.

Another object of the invention is to provide apparatus for achieving the above objective with equipment which is simple, relatively inexpensive and easy to maintain.

Another object is to provide volume measuring and recording apparatus readily adaptable for uses other than the measuring of lumber.

Other objects and advantages of the invention will become apparent from a perusal of this specification.

In the drawings:

Figure 1 is a schematic drawing of an electrical circuit employed in this invention;

Figure 2 is a schematic drawing of a portion of the apparatus employed in the invention;

Figure 3 is a schematic illustration in plan view of some of the same apparatus;

Figure 4 is a schematic drawing showing a modification of the circuit of Fig. 1;

Figure 5 is a schematic drawing illustrating another modified circuit which may be substituted for the circuit of Fig. 1; and Figure 6 is a schematic drawing illustrating another form of volume measuring apparatus.

Referring now to Figures 1 to 3 inclusive, a conventional watt hour meter indicated as 11 is connected in an alternating current circuit as shown to an autotransformer 12, the variable or adjustable secondary of which is connectable, through a later described mechanism, to a plurality of switches 13 and resistances 14 arranged in parallel.

The "green" chain heretofore mentioned is indicated schematically in Figures 2 and 3 as 15, and may be a conventional "green" chain equipped at intervals with spaced apart dogs 16 suitably secured to the chain and extending upwardly above the chain raceways 17 for propelling the boards along the chain raceways. Some appropriate means usually will also be provided in connection with the "green" chain, such as the conventional rollers 18 rotated continuously by any suitable means (not shown) for engaging the boards as they advance along the green chain and propelling them toward an end guide rail 19 against which all of them will be thereby abutted so that their lengths may thereafter conveniently be measured. The top surface of the rollers rotate in the direction shown by the arrows and when they are encountered by a board they will quickly propel it lengthwise into end abutment with the end guide 19. The details of construction of the "green" chain and rollers thus far mentioned are conventional and do not form a part of this invention, but are here briefly described in order that their coordination with the invention may be understood.

In order that the boards may all be aligned on the chain perpendicular to its direction of travel one or more aligning fingers such as 21 each pivotally supported at 22 above the green chain and normally held by a spring 23 against a stop pin 24 will be provided. As the boards individually engage such aligning fingers they will be pushed back against the chain dogs 16 and thereby be properly aligned transversely of the chain.

For the purpose of measuring the length of any board being conveyed by the chain, we provide a plurality of micro-switches 13, each having an operating arm 25 which, when depressed by the passage of a board thereover, will close a circuit through a conventional micro-switch 13, the details of which are not shown. Switches of this character are conventional and readily obtainable. These switches, for the purpose of measuring lumber of the usual commercial lengths will be spaced apart at two-foot intervals transversely of the green chain and will be as numerous as is required for measuring the longest boards carried by the chain. However, if a mill chooses to cut lumber in other than conventional lengths the switches will be spaced in accordance with the selected lengths to be cut.

For example, it could be arranged that an 8-foot board would simultaneously actuate only 4 switches, a 10-foot board 5 switches, and a 14-foot board 7 switches, and so on. When such switches become closed they will cooperate with the thickness measuring apparatus to establish circuits through their associated resistances 14 so that the total resistance thus cut into circuit with the watt hour meter by any board will be the product of the number of switches actuated by that board, multiplied by the standard or uniform resistance associated with each switch and subject to voltage determined by the thickness responsive apparatus.

According to the form of invention illustrated in Figs. 1, 2 and 3, provision is made for measuring the board feet, or volume, of lumber of various lengths and such thicknesses as 1 inch, 2 inch, 3 inch and 4 inch. Constant resistances are preferred and accordingly the resistances identified as 14 may, for illustrative purposes, be deemed to be 115 v. incandescent lamps.

For regulating the voltage to be applied across these resistances in accordance with the thickness of the boards being measured we provide an arm 26 pivoted at 27 and supported in any suitable manner above the chain close enough to the end guide 19 to be contacted by the shortest boards and having a contact shoe 28 connected to the wire 29 rotatable in an arc across several fixed contact buttons suitably supported adjacent thereto. A suitable spring 30 urges the arm 26 against the advancing boards. This mechanism is so proportioned and arranged that a 1" board, for example, will cause the shoe 28 to engage the contact 31, a 2" board will cause the shoe to engage the contact 32, a 3" board, if any are being sawn, to effect engagement of the shoe with the contact 33, while a 4" board will cause the shoe to engage contact 34.

The autotransformer will be designed and appropriate secondary taps provided on it in accordance with the known principle that $$W = \frac{E^2}{R}$$

If, for example, the constant voltage in the line wires 35 and 36 and in the load wires 37 and 38 is 115 volts, the circuit through contact button 34 which is in circuit when a 4" board is being measured will by-pass the transformer through wire 39, and the voltage across the resistances 14 between wires 29 and 41 will be 115 volts. The contact button 33 for measuring 3" boards will be connected to the 99.6 volt binding posts on the secondary side of the transformer. Button 32 may be connected to the 81.3 volt binding post and button 31 to the 57.5 volt binding post. In the actual design of the transformer the voltage calculations will be carried beyond one decimal point.

By any conventional means, not shown, the green chain will be caused to operate continuously at a uniform known speed and when the arm 26 has become rotated to a position which is responsive to the thickness of the board a plurality of length measuring switches 13 proportionate to the length of the board will then simultaneously be actuated and these switches will remain actuated for a time interval which is determined by the width of the board being carried by the chain at a uniform known speed. Thus the amount of power measured by the watt hour meter 11 during the passage of any board through the measuring position will be determined by the three dimensions of the board. A standard commercial watt hour meter and a factor may then be used to compute from the kilowatt hour readings the board measure in thousands of board feet, or by appropriate arrangement of the gears and dials in the meter, the meter may be caused to record directly in thousands of board feet.

It is recognized that the green lumber usually conveyed by a green chain does not have dimensions which at that time read exactly in thicknesses of 1 or 2 inches, etc., or exactly in widths of 4", 6", etc., or necessarily in exact 2-foot length increments, due to the fact that overage allowances are made initially to allow for the shrinkages which occur during drying and planing of such lumber. Hence, the apparatus as described need not measure fractions of an inch exactly nor even inches exactly, although it is apparent that if any operator desired to do so the contact points contacted by shoe 28 could be more numerous and could be spaced at such close intervals as to measure such fractional dimensions. In such a case the switches and the autotransformer would be designed and equipped with the necessary additional taps. For the purpose of measuring various articles other than green lumber, the measuring of smaller increments could thus be accomplished.

The equipment above described and shown in Figs. 1–3, records the volume of lumber of various lengths and thickness in a single total of board feet. However, if it be desired to record the total board feet of 1" lumber separately from 2" lumber, for example, the means for doing it are suggested in Fig. 4. In such a case a watt hour meter 42 will measure the board feet of the 2" lumber when the contact shoe 28 is on the button 43, the voltage across the resistances being 115 volts.

When measuring 1" boards the shoe 28 will contact the button 44 and the lead 45 therefrom will be connected to a 81.3 volt binding post, of autotransformer 46, and meter 47 will record the volume of 1" lumber. Additional meters and secondary voltage taps in like manner may be provided to separately total additional thicknesses.

The modification shown in Fig. 5 employs no transformer. A 115 volt supply line represented by wires 51 and 52 is connected to a watt hour meter 53. One load line 54 is connected with one side of each switch 13. The other side of each normally open switch 13 is connected, not to a single resistance 14 as in Fig. 1, but rather to as many resistances 14 as there are different thicknesses of lumber to be measured. Otherwise, the switches 13 are positioned and operated as described above in connection with Fig. 1.

The thickness responsive lever 26' is similar in location and operation to lever 26 of Fig. 1 but instead of having a conductor type of shoe 28 this one has preferably a non-conductor shoe 55 which as it rotates will press against and close a suitable normally open switch 56 when 1" lumber is passing through the measuring zone, or switch 57 for 2" lumber, switch 58 for 3" lumber, or switch 59 for 4" lumber. Switches 55 to 59 may be multiple contact microswitches. The number of switches 13 closed at the time will correspond to the length of the piece of lumber. As will be apparent from the wiring diagram, the number of resistances or lamps energized by each switch will depend on which of the switches 56 to 59 is closed to complete the circuit back to the meter through load wire 61. Thus the total board feet of the lumber passing over the green chain may be recorded by meter 53 utilizing a single voltage.

Should an operator desire to employ a plurality of meters for recording the board measure of 1", 2", 3" and 4" lumber separately he may use the switches 13 and resistors 14 shown in Fig. 5 and provide 4 meters connected in parallel with line wires 51 and 52. The first load wire such as 54 of Fig. 5 could be common to each meter, but the other or second load wire such as 61 from the 1" meter would run only to a switch corresponding to switch 56, the second load wire from the 2" meter would run only to a switch corresponding to switch 57. In a similar manner the meters for measuring 3" and 4" lumber could be connected to switches 58 and 59.

In Figure 6 is shown another modification wherein a separate meter records the board feet of each separate board thickness. If the boards being measured are 1", 2", 3" and 4" in thickness, for example, meters 71, 72, 73 and 74 will be employed. A thickness responsive lever 75, similar to that shown in Fig. 1 will selectively connect load wires 76, 77, 78 or 79 of these meters, in accordance with the board thickness being measured, with the wire 81 through the conducting shoe 82. The other load wires 83 to 86 of the meters are constantly connected with wire 87. Switches 88 of Fig. 6 will correspond in position and function with switches 13 of Fig. 1, and resistors 89 will correspond with resistors 14 of Fig. 1. Suitable gears in meters 72 to 74 may be provided to cause them to operate and record proportionately faster than meter 71, that is, twice as fast, three times as fast, etc., or different multiplying factors may be used with the readings of identical commercial watt hour meters. Thus the board measure of lumber of different thicknesses may be separately totaled.

The resistance employed in any of the circuits may or may not be all of the same size but if varied therefrom their number and size will be such as to cooperate in affording readings proportional to the volume of the lumber being measured.

While measuring on the green chain has been described herein, finished or unfinished lumber may be measured in like manner elsewhere.

Accordingly, it should be understood that the invention is subject to considerable modification and variation without departing from the principles of the invention defined in the appended claims.

Having shown and described our invention, we claim:

1. In a lumber measuring apparatus, a lumber conveyor operable at a constant speed, a source of electrical power, means for aligning boards on the conveyor extending transversely thereof with corresponding ends of each in a common vertical plane, contact members spaced at equal linear unit intervals transversely of the conveyor in a common measuring zone for individual simultaneous actuation by each individual board passing through said zone in proportion to the number of predetermined unit lengths of the board, circuit closing means operable by said contact members and resistors connectible in parallel by said circuit closing means for a time period proportional to the width of each board and its rate of travel through said zone, watt hour measuring and recording means connected with said power source, and means including a member movable by contact with each board in proportion to the vertical dimension of the board cooperating with said circuit closing means for connecting to the watt hour measuring means a steady wattage load imposed by the connected resistors in proportion to the volume of each board being measured for the duration of the passage of the board through said zone.

2. In a lumber measuring apparatus, a lumber conveyor operable at a constant speed, a source of electrical power, means for aligning boards on the conveyor extending transversely thereof with corresponding ends of each in a common vertical plane, contact members spaced at equal linear unit intervals transversely of the conveyor in a common measuring zone for individual simultaneous actuation by a board passing through said zone, circuit closing means operable by said contact members, resistors connectible in parallel by said circuit closing means, a plurality of separate watt hour meters connected to said power source, and means including a member movable by contact with each board in proportion to the vertical dimension of the board and selectively into cooperation with one of the several meters and said circuit closing means for connecting a wattage load to said meter in proportion to the volume of the board being measured.

3. In an apparatus for measuring and recording the volume of sawn lumber, a source of electrical power, the combination of a lumber conveyor operable at a constant speed, watt hour recording means connected to said power source, an electrical load circuit, thickness responsive control means, a plurality of resistors and circuit closing means connected with the resistors and simultaneously actuated by each individual board in proportion to the number of predetermined unit lengths of the board for such time period as is required for the width of the board to pass through a measuring zone on the conveyor, said circuit closing means connecting resistance to the load circuit in proportion to the length of the board, said control means cooperating with the circuit closing means and responsive to the vertical thickness of each board for connecting a steady wattage load to the recording means proportionate to the volume of each board.

4. In an apparatus for measuring and recording the volume of sawn lumber, a source of electrical power, the combination of a lumber conveyor operable at a constant speed, watt hour recording means connected with said power source and an electrical load circuit connectable therewith, thickness responsive control means, a plurality of resistors, switches connected each with a resistor and spaced at predetermined intervals transversely of the conveyor in a measuring zone, a plurality of said switches being individually operable by each board in number proportionate with its length and for a duration proportionate to its width as it passes through said zone, said control means and the operated switches cooperating with each other to establish a circuit connecting the load circuit to the recording means carrying a total resistance proportionate to the length of each board and a wattage load proportionate to the volume of each board.

5. In an apparatus for measuring and recording the volume of sawn lumber, a source of electrical power, the combination of a lumber conveyor operable at a constant speed, power consumption recording means connected with said power source and an electrical load circuit connectable therewith, thickness responsive control means, a plurality of resistors, switches connected each with said resistors and spaced at predetermined intervals transversely of the conveyor in a measuring zone, said switches being individually and simultaneously operable by each board in proportion to the number of predetermined unit lengths of the board and for a duration proportionate to its width as it passes through said zone for connecting resistors to the load circuit, said control means cooperating with the switches to connect to the load circuit and recording means a total resistance proportionate to the length of each board and a power load proportionate to the volume of each board.

6. In an apparatus for measuring and recording the volume of sawn lumber, a source of electrical power, the combination with a lumber conveyor operable at a constant speed, power consumption recording means for each thickness of board to be measured and connected with said power source, a load circuit, a plurality of switches spaced apart at predetermined intervals in a measuring zone and resistors controlled thereby operable by individual lumber pieces moving through said zone on the conveyor, thickness responsive control means located at said zone operable by and proportionate to the vertical thickness of the lumber pieces adapted for establishing a circuit from the power source through simultaneously operated switches and resistors to the recording means for effecting the separate recording of the volume of sawn lumber of different thicknesses.

7. In a lumber measuring apparatus, a lumber conveyor operable at a constant speed, a source of electrical power, means for aligning boards on the conveyor extending transversely thereof with corresponding ends of each normal to and in a common vertical plane, contact members spaced at equal linear unit intervals transversely of the conveyor in a common measuring zone for individual simultaneous actuation by each individual board passing through said zone in proportion to the number of predetermined unit lengths of the board, circuit closing means operable by said contact members and resistors connectible in parallel by said circuit closing means for a time period proportional to the width of each board and its rate of travel through said zone, watt hour measuring and recording means connected with said power source, thickness responsive means movable by contact with each board in proportion to the vertical thickness dimension of the board, a transformer connected with said watt hour means having a plurality of secondary taps of different predetermined voltages, and means actuated by said thickness means and including circuits connecting a steady wattage load to said watt hour means selectively through a secondary tap determined by the thickness of each board and through such resistors as are energized by said contact members whereby the wattage load is in proportion to the volume of each board for the duration of the passage of the board through said zone.

8. In a lumber measuring apparatus, a lumber conveyor operable at a constant speed, a source of electrical power, means for aligning boards on the conveyor extending transversely thereof with corresponding ends of each normal to and in a common vertical plane, contact members spaced at equal linear unit intervals transversely of the conveyor in a common measuring zone for individual simultaneous actuation by each individual board passing through said zone in proportion to the number of predetermined unit lengths of the board, circuit closing means operable by said contact members and resistors connectible in parallel by said circuit closing means for a time period proportional to the width of each board and its rate of travel through said zone, watt hour measuring and recording means connected with said power source, thickness responsive means movable by contact with each board in proportion to the vertical thickness dimension of the board, there being as many resistors of equal ohmic resistance electrically associated with the circuit closing means operated by each contact member as there are different thicknesses of boards to be measured by the apparatus, and means actuated by said thickness means and including circuits cooperating with each circuit closing means operated by its associated contact member adapted to energize a number of resistors associated with each actuated contact member in proportion to the thickness of the board being measured and simultaneously thereby connect to the watt hour means a wattage load for the duration of the passage of the board through said zone in proportion to the volume of each board being measured.

References Cited in the file of this patent

UNITED STATES PATENTS

| | | |
|---|---|---|
| 1,539,398 | Roettger | May 26, 1925 |
| 1,560,046 | Dye | Nov. 3, 1925 |
| 2,617,197 | Derby | Nov. 11, 1952 |